(12) United States Patent
Furusawa

(10) Patent No.: US 8,991,450 B2
(45) Date of Patent: Mar. 31, 2015

(54) PNEUMATIC TIRE

(75) Inventor: Hiroshi Furusawa, Hiratsuka (JP)

(73) Assignee: The Yokohama Rubber Co., Ltd. (JP)

(*) Notice: Subject to any disclaimer, the term of this patent is extended or adjusted under 35 U.S.C. 154(b) by 562 days.

(21) Appl. No.: 13/252,871

(22) Filed: Oct. 4, 2011

(65) Prior Publication Data

US 2012/0080129 A1  Apr. 5, 2012

(30) Foreign Application Priority Data

Oct. 4, 2010 (JP) .................... 2010-225092

(51) Int. Cl.
*B60C 11/03* (2006.01)
*B60C 11/12* (2006.01)
*B60C 11/13* (2006.01)

(52) U.S. Cl.
CPC ............ *B60C 11/12* (2013.01); *B60C 11/1259* (2013.04); *B60C 11/032* (2013.04); *B60C 11/1218* (2013.04); *B60C 11/1376* (2013.04); *Y10S 152/03* (2013.01)
USPC ............ 152/209.15; 152/209.17; 152/DIG. 3

(58) Field of Classification Search
CPC .. B60C 11/032; B60C 11/12; B60C 11/1218; B60C 11/1376; B60C 11/00; B60C 11/0083; B60C 11/03; B60C 11/0306; B60C 11/0327; B60C 11/04; B60C 11/11; B60C 11/1259; B60C 11/14
USPC ............ 152/209.15, 210–212, 209.1, DIG. 3, 152/209.17; D12/608, 604

IPC ....................................................... B60C 11/03
See application file for complete search history.

(56) References Cited

U.S. PATENT DOCUMENTS

| | | | | | |
|---|---|---|---|---|---|
| 1,254,050 | A | * | 1/1918 | Macbeth | 152/209.15 |
| D79,685 | S | * | 10/1929 | Hower | D12/578 |
| 5,203,933 | A | * | 4/1993 | Nagahisa | 152/209.15 |
| 2008/0135150 | A1 | * | 6/2008 | Kiwaki et al. | 152/209.25 |

FOREIGN PATENT DOCUMENTS

| | | | |
|---|---|---|---|
| CH | 69711 A | 7/1915 | |
| JP | 07001919 A * | 1/1995 | ............. B60C 11/12 |
| JP | 2002248911 A | 9/2002 | |
| JP | 2006-151231 | 6/2006 | |

OTHER PUBLICATIONS

German Office Action; dated Mar. 20, 2012.

* cited by examiner

*Primary Examiner* — Richard Crispino
*Assistant Examiner* — Philip N Schwartz
(74) *Attorney, Agent, or Firm* — Thorpe North & Western

(57) ABSTRACT

A pneumatic tire including rib-like land portions partitioned by a plurality of main grooves extending in a tire circumferential direction and/or block-like land portions partitioned by the plurality of main grooves and a plurality of lug grooves intersecting the main grooves in a tread surface. A plurality of protrusions are provided on a surface of the land portions, and at least two types of the protrusions, having different surface areas, are provided. Moreover, at least a majority of the protrusions adjacent to a small protrusion having a relatively small surface area are large protrusions having a relatively large surface area.

12 Claims, 7 Drawing Sheets

| | Conventional Example | Working Example 1 | Working Example 2 | Working Example 3 | Working Example 4 | Working Example 5 | Working Example 6 | Working Example 7 | Working Example 8 | Working Example 9 | Working Example 10 |
|---|---|---|---|---|---|---|---|---|---|---|---|
| Number of large protrusions adjacent to small protrusion | None | All | All | All | All | All | All | All | All | All | All |
| Small protrusion surface area S1 (mm²) | No | 5 | 5 | 5 | 5 | 5 | 5 | 5 | 5 | 5 | 5 |
| Small protrusion surface area S1/Large protrusion surface area S2 (%) | No | 18 | 20 | 75 | 40 | 40 | 40 | 40 | 40 | 40 | 40 |
| Protrusion height H (mm) | No | 1.2 | 1.2 | 1.2 | 0.1 | 1.0 | 0.3 | 0.3 | 0.3 | 0.3 | 0.3 |
| Minimum distance D between adjacent large protrusions (mm) | No | 1.2 | 1.2 | 1.2 | 1.2 | 1.2 | 0.3 | 1.0 | 0.6 | 0.6 | 0.6 |
| Protrusion total ground contact area S2/Land portion surface area SL (%) | No | 45 | 45 | 45 | 45 | 45 | 45 | 45 | 50 | 90 | 80 |
| Protrusion ground contact shape | None | Hexagonal | Hexagonal | Hexagonal | Hexagonal | Hexagonal | Hexagonal | Hexagonal | Hexagonal | Hexagonal | Circular |
| Braking ability on ice | 100 | 115 | 118 | 111 | 109 | 112 | 108 | 127 | 125 | 128 | 130 |
| Steering stability on snow | 100 | 103 | 102 | 100 | 110 | 105 | 110 | 104 | 105 | 107 | 108 |

FIG. 7

PNEUMATIC TIRE

PRIORITY CLAIM

Priority is claimed to Japan Patent Application Serial No. 2010-225092 filed on Oct. 4, 2010.

BACKGROUND

1. Technical Field

The present technology relates to a pneumatic tire, and particularly relates to a pneumatic tire with enhanced performance on snow and ice at initial use.

2. Related Art

Pneumatic tires known as "studless tires" are known that have enhanced performance on snow and ice such as braking ability on ice and steering stability on snow when traveling on icy and snowy road surfaces. Some studless tires use tread portion compounds including fine protrusions as a filler so as to obtain an edge effect of nipping icy surfaces, and some studless tires use a rubber material including fine voids for the tread portion so as to obtain an edge effect and a water absorption effect.

However, generally, when vulcanizing and curing the rubber, an irregular rubber layer including the filler or the fine voids is not exposed from the tread surface that is in direct contact with the mold, and instead the tread surface is substantially flat. Therefore, at initial use of the tire, the effects of the filler and/or the fine voids may not be sufficiently displayed because the irregular rubber layer formed using the filler and/or the fine voids does not exist on the tread surface.

Conventionally, Japanese Unexamined Patent Application Publication No. 2006-151231A describes a pneumatic tire including a plurality of land portions partitioned by a plurality of main grooves in a tread surface, wherein sub-blocks are formed by dividing the land portions by at least one sipe extending in the tire width direction. On the land portion, a plurality of shallow grooves that is shallower than the sipe and that have a form that is enclosed in the land portion are formed so as to be isolated, that is, so as not to intersect or come in contact with each other. With the pneumatic tire described in Japanese Unexamined Patent Application Publication No. 2006-151231A, the edge effect of the main groove works against relatively large forces, the edge effect of the sipes works against relatively small forces that cause no more than deformation of the land portion, and the edge effect of the shallow grooves works against minute forces.

However, with the pneumatic tire described in Japanese Unexamined Patent Application Publication No. 2006-151231A, the shallow grooves having the form that is enclosed in the land portion are formed so as to be isolated, that is, so as to not intersect or come in contact with the sipe. Therefore, a water path formed by the shallow grooves is closed, and, snow and water discharge performance cannot be enhanced. This leads to the problem of performance on snow and ice not being readily enhanced.

SUMMARY

The present technology provides a pneumatic tire that discharges snow and water sufficiently, even at initial use, and that has enhanced performance on snow and ice. The pneumatic tire includes a rib-like land portion partitioned by a plurality of main grooves extending in a tire circumferential direction and/or a block-like land portion partitioned by the plurality of main grooves and a plurality of lug grooves intersecting the main grooves in a tread surface. A plurality of protrusions is provided on a surface of the land portion, and at least two types of the protrusions, having different surface areas, are provided. Moreover, at least a majority of the protrusions adjacent to the protrusions having a relatively small surface area are protrusions having a relatively large surface area.

With this pneumatic tire, as a result of the plurality of protrusions being disposed in the surface of the land portion, a substantial contact patch can be ensured due to water of a water film interposed between an icy road surface and the surface of the land portion being discharged via a water path formed between the protrusions. Thus, it is possible to enhance performance on ice. Moreover, at least two types of the protrusions, having different surface areas, are provided and at least a majority of the protrusions adjacent to a protrusion having a relatively small surface area are protrusions having a relatively large surface area. Therefore, a recess is formed in which the large protrusions surround a small protrusion, and the water of the water film in this recess and/or snow adhered to the surface of the land portion is collected. As a result, discharge of the water and of the snow is facilitated and, thus, it is possible to enhance performance on snow and ice. Therefore, it is possible to discharge snow and water sufficiently, even at initial use, and enhance performance on snow and ice.

Additionally, with the pneumatic tire of the present technology, sipes or small holes are formed in the surface of the land portion, and the protrusions have a step that is smaller than a depth of the sipes or small holes.

With this pneumatic tire, the sipes or small holes are formed in the surface of the land portion. This leads to the obtaining of edge effects and water discharging effects and, together with the protrusions, makes possible a prominent enhancement of performance on snow and ice.

Additionally, with the pneumatic tire of the present technology, a surface area $S1$ of one of the protrusions having the relatively small surface area is such that $0.05 \text{ mm}^2 \leq S1 \leq 20 \text{ mm}^2$, and is configured so as to be $20\% \leq S1/S2 \leq 75\%$ with respect to a surface area $S2$ of one of the protrusions having the relatively large surface area.

With this pneumatic tire, the surface area $S1$ of one of the small protrusions is such that $0.05 \text{ mm}^2 \leq S1 \leq 20 \text{ mm}^2$ and is configured so as to be not less than 20% with respect to the surface area $S2$ of one of the large protrusions. Therefore, it is possible to ensure the rigidity of the actual contact patch. Additionally, the surface area $S1$ of one of the small protrusions is such that $0.05 \text{ mm}^2 \leq S1 \leq 20 \text{ mm}^2$ and is configured so as to be not more than 75% with respect to the surface area $S2$ of one of the large protrusions. Therefore, a path for water discharging and a recess for snow discharging are obtained and it is possible to enhance water discharge performance and snow discharge performance. Therefore, with this pneumatic tire, water discharge performance and snow discharge performance are enhanced while the rigidity of the actual contact patch is ensured, and performance on snow and ice can be further enhanced.

Additionally, with the pneumatic tire of the present technology, a height $H$ of the protrusions is configured such that $0.1 \text{ mm} \leq H \leq 1.0 \text{ mm}$.

With this pneumatic tire, it is possible to obtain a path and recess sufficient for discharging water and snow due to the height $H$ of the protrusions being configured so as to be not less than 0.1 mm. Additionally, it is possible to suppress uneven wear (heel & toe wear) caused by deformation when the protrusions come in contact with the ground due to the height $H$ of the protrusions being configured so as to be not more than 1.0 mm. Therefore, with this pneumatic tire, water discharge performance and snow discharge performance are enhanced while the suppression of uneven wear at ground contact is ensured, and performance on snow and ice can be further enhanced.

Additionally, with the pneumatic tire of the present technology, a minimum distance D between adjacent protrusions having the relatively large surface area is configured such that 0.3 mm≤D≤1.0 mm.

With this pneumatic tire, it is possible to ensure a path sufficient for discharging water due to the minimum distance D between adjacent large protrusions being configured so as to be not less than 0.3 mm. Additionally, it is possible to suppress a decline in the rigidity of the land portion and maintain traveling performance due to the minimum distance D between adjacent large protrusions being configured so as to be not more than 1.0 mm. Therefore, with this pneumatic tire, traveling performance is maintained while the water discharging effect is obtained, and performance on snow and ice can be further enhanced.

Additionally, with the pneumatic tire of the present technology, a total ground contact area SP of the protrusions in a given land portion with respect to a surface area SL of the land portion is configured such that 50%≤SP/SL≤90%.

With this pneumatic tire, the total ground contact area SP of the protrusions in a given land portion with respect to the surface area SL of the land portion is configured to be not less than 50%. Therefore, it is possible to ensure the rigidity of the actual contact patch. Additionally, the total ground contact area SP of the protrusions with respect to the surface area SL of the land portion is configured to be not more than 90%. Therefore, a path for water discharging and a recess for snow discharging are obtained and it is possible to enhance water discharge performance and snow discharge performance. Therefore, with this pneumatic tire, water discharge performance and snow discharge performance are enhanced while the rigidity of the actual contact patch is ensured, and performance on snow and ice can be further enhanced.

Additionally, with the pneumatic tire of the present technology, a ground contact shape of the protrusions is circular.

With this pneumatic tire, due to the ground contact shape of the protrusions being circular, ensuring a path width at forks and intersections in the path for discharging water is facilitated and a difference in rigidity with respect to an angle of external forces on the protrusions can be mitigated. Therefore, variations in traveling performance can be suppressed.

The pneumatic tire according to the present technology discharges snow and water sufficiently, even at initial use, and can enhance performance on snow and ice.

BRIEF DESCRIPTION OF THE DRAWINGS

FIG. 5-1 is a side view of a protrusion of the pneumatic tire according to the embodiment of the present technology.

FIG. 5-2 is a side view of the protrusion of the pneumatic tire according to the embodiment of the present technology.

FIG. 5-3 is a side view of the protrusion of the pneumatic tire according to the embodiment of the present technology.

FIG. 7 is a table showing results of performance testing of pneumatic tires according to examples of the present technology.

DETAILED DESCRIPTION

An embodiment of the present technology is described below in detail based on the drawings. However, the present technology is not limited to this embodiment. The constituents of the embodiment include constituents that can be easily replaced by those skilled in the art and constituents substantially same as the constituents of the embodiment. Furthermore, a plurality of modified examples that are described in the embodiment can be freely combined within a scope of obviousness for a person skilled in the art.

In the following description, "tire radial direction" refers to a direction orthogonal to the rotational axis (not shown) of the pneumatic tire; "inner side in the tire radial direction" refers to the side facing the rotational axis in the tire radial direction; and "outer side in tire radial direction" refers to the side distanced from the rotational axis in the tire radial direction. Additionally, "tire width direction" refers to the direction parallel to the rotational axis; "inner side in the tire width direction" refers to the side that is near to a tire equatorial plane (not shown) in the tire width direction; and "outer side in the tire width direction" refers to the side that is far from the tire equatorial plane in the tire width direction. Furthermore, "tire circumferential direction" refers to a circumferential direction with the rotational axis as a center axis. Additionally, "tire equatorial plane" refers to a plane that is orthogonal to the rotational axis of the pneumatic tire and that passes through a center of a tire width of the pneumatic tire.

Figure 1:
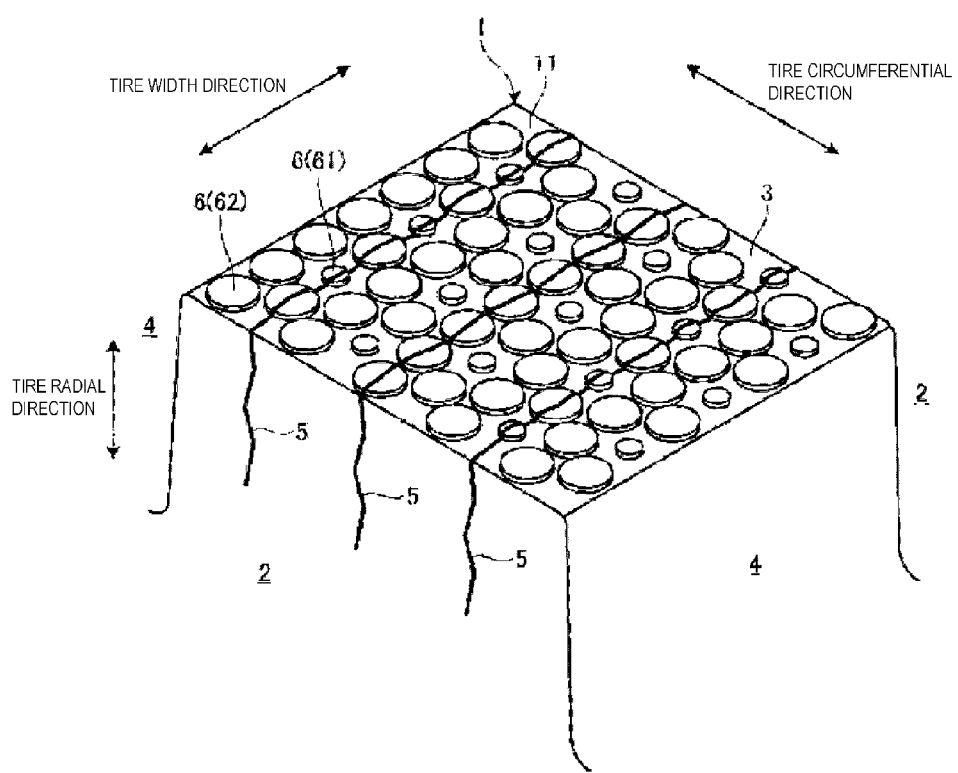
FIG. 1 is a perspective view of a land portion of a pneumatic tire according to an embodiment of the present technology.
Figure 2:
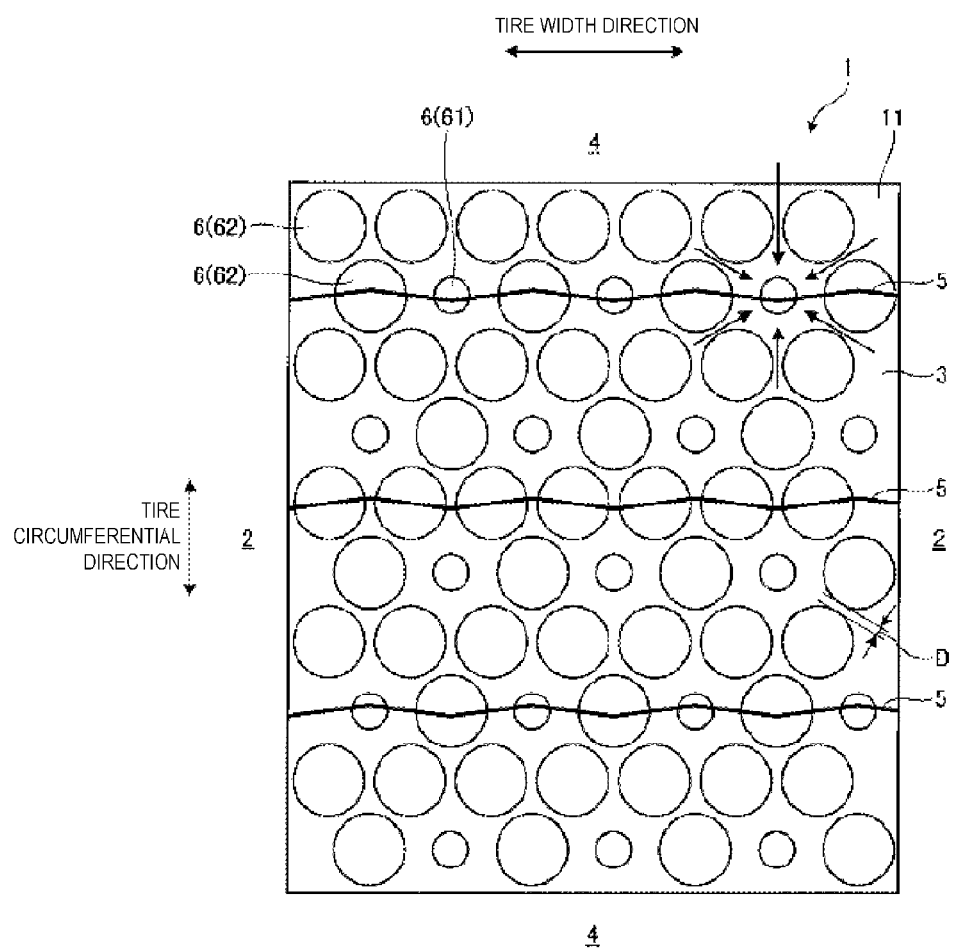
FIG. 2 is a plan view of a tread surface of the pneumatic tire according to the embodiment of the present technology.

The pneumatic tire of this embodiment is suitable as a studless tire for use on icy and snowy road surfaces and as an all-season tire. As illustrated in FIGS. 1 and 2, the pneumatic tire includes a tread portion 1. The tread portion 1 is formed from a rubber material, is exposed on the outermost side in the tire radial direction of the pneumatic tire, and a surface (hereinafter referred to as "tread surface") 11 thereof constitutes a profile of the pneumatic tire. In this embodiment, the tread surface 11 is a road contact surface that contacts the road surface when a vehicle on which the pneumatic tire is mounted (not illustrated) is traveling.

A plurality of main grooves 2 that extend along the tire circumferential direction is arranged in parallel in the tire width direction in the tread surface 11. "Extending along the tire circumferential direction" includes extending within angles in a range of ±5 degrees (substantially 0 degrees) with respect to the tire circumferential direction. In the case of a new tire, "main grooves 2" refers to grooves open to the tread surface 11 that are defined by having a groove width of not less than 3 mm and a groove depth of not less than 4 mm. Moreover, a plurality of rib-like land portions 3 extending along the tire circumferential direction and parallel with the tire equatorial plane is formed in the tread surface 11 by the plurality of main grooves 2.

Additionally, in the tread surface 11, a plurality of lug grooves 4, provided so as to intersect (communicate with) the main grooves 2 and having edge components in the tire circumferential direction, is arranged in parallel in the tire circumferential direction. The lug grooves 4 are provided so as to be parallel to, or have a given angle with respect to, the tire width direction. Moreover, the lug grooves 4 may be provided so as to curve or bend. In the case of a new tire, the "lug grooves 4" do not belong to the definition of the main grooves 2 or a sipe 5 or small hole described below, and are grooves having a groove depth that is not greater than the groove depth of the main grooves 2. Furthermore, in the tread surface 11, the plurality of lug grooves 4 is provided so as to intersect (communicate with) the main grooves 2 that are adjacent in the tire width direction. Therefore, the rib-like land portions 3 are formed into a plurality of block-like land portions 3 by the plurality of main grooves 2 and the plurality of lug grooves 4. In FIGS. 1 and 2, the land portions 3 are illustrated as a block-like land portion. Note that when the lug grooves 4 are provided so as to only intersect (communicate with) one of the main grooves 2 adjacent in the tire width direction, rib-like land portions 3 are formed.

Sipes 5 or small holes (not illustrated) are formed in the surface (tread surface 11) of the land portions 3 described above. The sipes 5 are cuts having a narrow groove form and extending mainly in the tire width direction. According to the embodiment, in FIGS. 1 and 2, the sipes 5 are illustrated as open sipes provided so as to be open to the main grooves 2 adjacent in the tire width direction. While not illustrated in the drawings, in addition to open sipes, the sipes 5 may be semi-closed sipes having one closed end or closed sipes having both ends closed. The sipes 5 enhance water discharging and snow discharging effects whereby water and snow between the road contact surface and the tread surface 11 are received into the grooves. Moreover, the sipes 5 enhance the edge effect. Thus, a plurality of the sipes 5 is preferably formed in the each of the rib-like or block-like land portions 3. Additionally, in the drawings, the sipes 5 are provided so as to pass through protrusions 6 described below, but may also be provided so as not to pass through the protrusions 6. Note that, in the case of a new tire, the "sipes 5" refers to sipes open to the tread surface 11 that are defined by having a groove width of not more than 1.2 mm and a groove depth that is not greater than the groove depth of the lug grooves.

Additionally, according to this embodiment, in FIGS. 1 and 2, the sipes 5 bend or curve in the tire circumferential direction and the tire radial direction. Therefore, cut faces, opposing in the tire circumferential direction, are three-dimensional and the sipes 5 are illustrated as mutually mating three-dimensional sipes.
While not illustrated in the drawings, in addition to such three-dimensional sipes, the sipes 5 may be two-dimensional sipes having cut faces with a bi-dimensional form that bend or curve only in the tire circumferential direction, two-dimensional sipes having cut faces with a bi-dimensional form that bend or curve only in the tire radial direction, or one-dimensional sipes having a single dimensional form that are formed linearly in the tire circumferential direction and the tire radial direction. Note that if the rigidity of the land portions 3 declines due to the disposal of the sipes 5, or if uneven wear resistance and steering stability on dry road surface decline, three-dimensional sipes and two-dimensional sipes by which the rigidity of the land portions 3 can be maintained as a result of the opposing cut faces supporting each other are preferably applied.

Note that, while not illustrated in the drawings, the "small holes" are holes with bottoms formed in plurality in the surface (tread surface 11) of the land portions 3. The small holes are provided at locations where the protrusions 6 (described below) are not provided. In the case of a new tire, the "small holes" refer to holes open to the tread surface 11 that are defined by having a diameter of not more than 1.2 mm and a depth that is not greater than the groove depth of the lug grooves.

A plurality of protrusions 6 having a step (height) that is less than the depth of the sipes 5 or the small holes is formed in the surface (tread surface 11) of the land portions 3 described above. At least two types of the protrusions 6, having different surface areas, are provided. Moreover, at least a majority of the protrusions adjacent to a small protrusion 61 having a relatively small surface area are large protrusions 62 having a relatively large surface area.

For example, as illustrated in FIG. 2, in the surface of the land portions 3, a row of large protrusions in which the large protrusions 62 are disposed at a given pitch in the tire width direction, and a row of mixed protrusions in which the small protrusions 61 and the large protrusions 62 are disposed alternately at a given pitch in the tire width direction are arranged alternately offset one pitch in the tire circumferential direction. In such an arrangement, the protrusions 6 adjacent to the small protrusion 61 are all the large protrusions 62.

Figure 3:
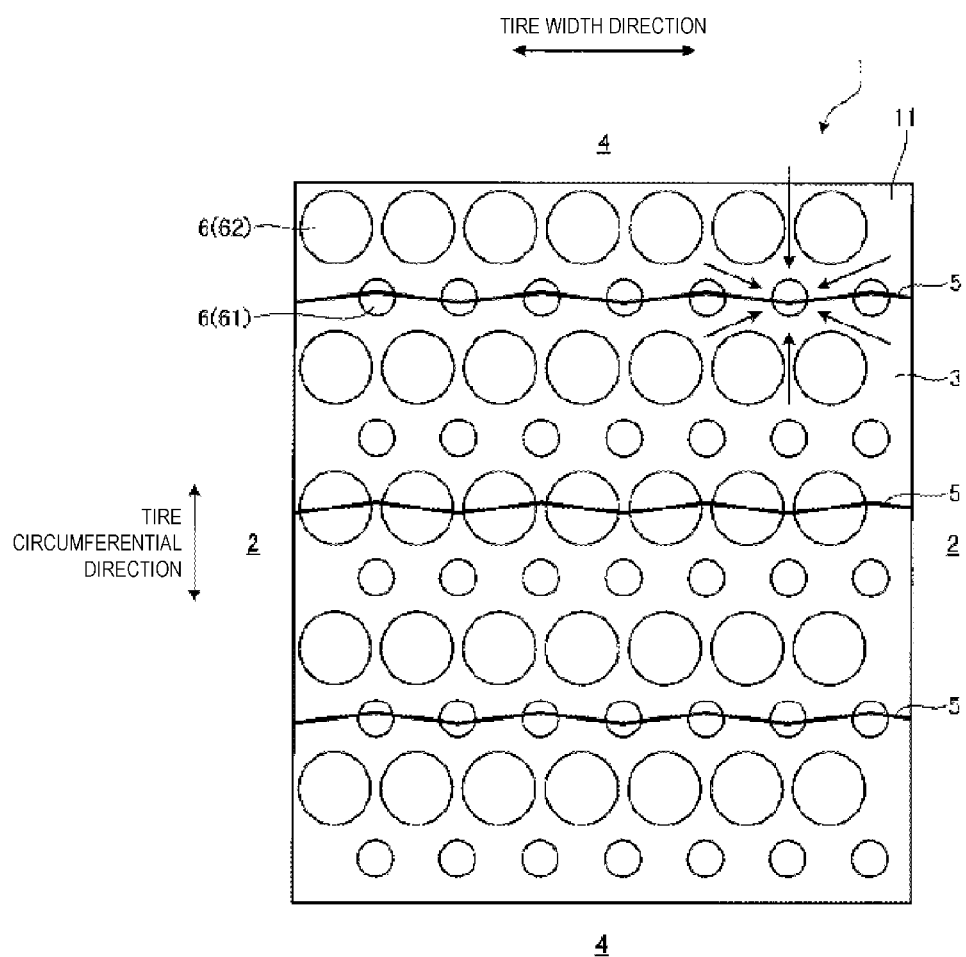
FIG. 3 is a plan view of the tread surface of the pneumatic tire according to the embodiment of the present technology.

Additionally, for example, as illustrated in FIG. 3, in contrast to the disposal of the protrusions 6 illustrated in FIG. 2, the row of mixed protrusions may be configured so as to be all small protrusions 61. In this case, four of a maximum six adjacent protrusions 6 around a small protrusion 61 are the large protrusions 62. Moreover, in peripheral portions of the land portions 3, four of five of the protrusions 6 around a small protrusion 61 are the large protrusions 62, two of four of the protrusions 6 around a small protrusion 61 are the large protrusions 62, and two of three of the protrusions 6 around a small protrusion 61 are the large protrusions 62.

Figure 4:
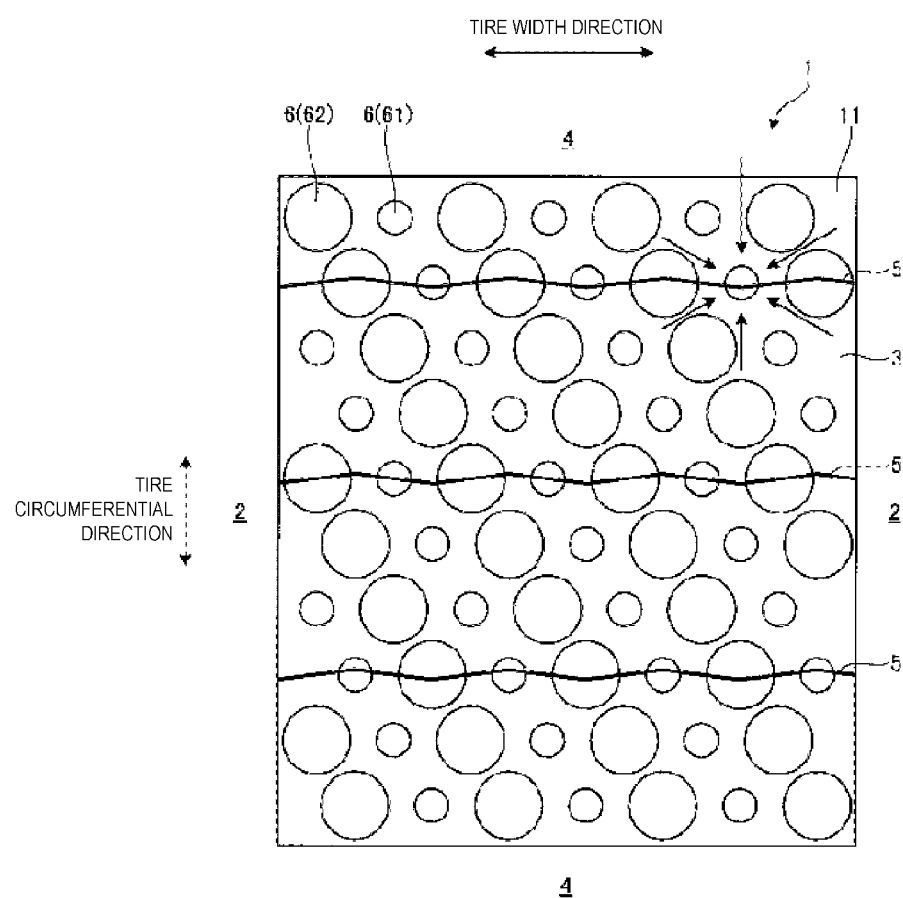
FIG. 4 is a plan view of the tread surface of the pneumatic tire according to the embodiment of the present technology.

Furthermore, for example, as illustrated in FIG. 4, in contrast to the disposal of the protrusions 6 illustrated in FIG. 2, all of the rows may be configured as rows of mixed protrusions in which the small protrusions 61 and the large protrusions 62 are disposed alternately in the tire width direction at a given pitch and each of the rows of mixed protrusions may arranged so as to be offset one pitch in the tire circumferential direction. In this case, four of a maximum six adjacent protrusions 6 around a small protrusion 61 are the large protrusions 62. Moreover, in peripheral portions of the land portions 3, three of five of the protrusions 6 around a small protrusion 61 are the large protrusions 62, three of four of the protrusions 6 around a small protrusion 61 are the large protrusions 62, and two of three of the protrusions 6 around a small protrusion 61 are the large protrusions 62.

Note that the arrangements of the protrusions 6 illustrated in FIGS. 2 to 4 are examples and it is sufficient that at least a majority of the protrusions adjacent to a small protrusion 61 having a relatively small surface area are large protrusions 62 having a relatively large surface area.

Figures 1, 5:
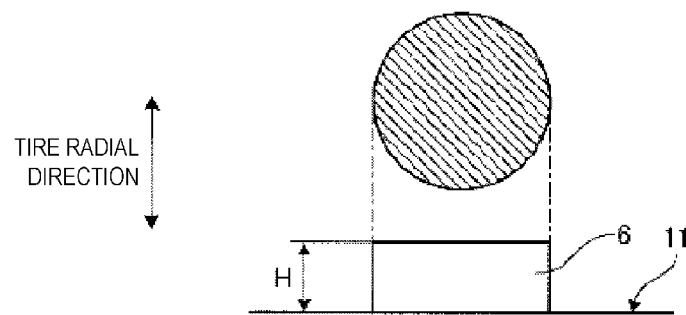
Figures 2, 5:
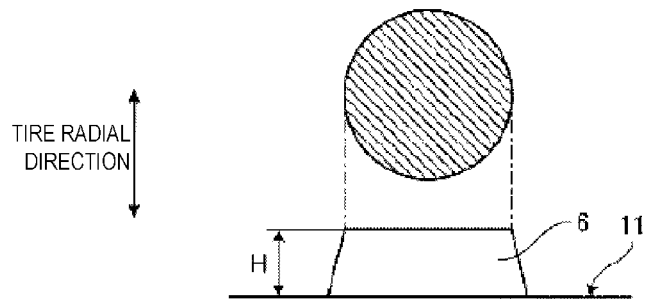
Figures 3, 5:
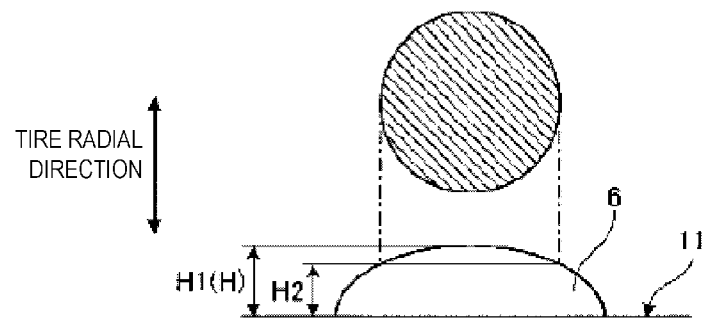

Next, the surface area of the protrusions 6 will be described. As illustrated in FIG. 5-1, when a side view of the protrusions 6 is rectangular, an area of the shape of a top thereof, when viewed planarly, is the surface area. Additionally, as illustrated in FIG. 5-2, when a side view of the protrusions 6 is trapezoidal, an area of the shape of a top thereof, when viewed planarly, is the surface area. Note that with the protrusions 6 illustrated in FIGS. 5-1 and 5-2, in addition to the top being flat, the top may also be convex and/or concave. Furthermore, as illustrated in FIG. 5-3, when a side view of the protrusions 6 is semi-elliptical (or partially spherical), an area of a shape, when viewed planarly, at a position of a height H2 that is 80% of a height H1 from the tread surface 11 is the surface area.

Figure 6:
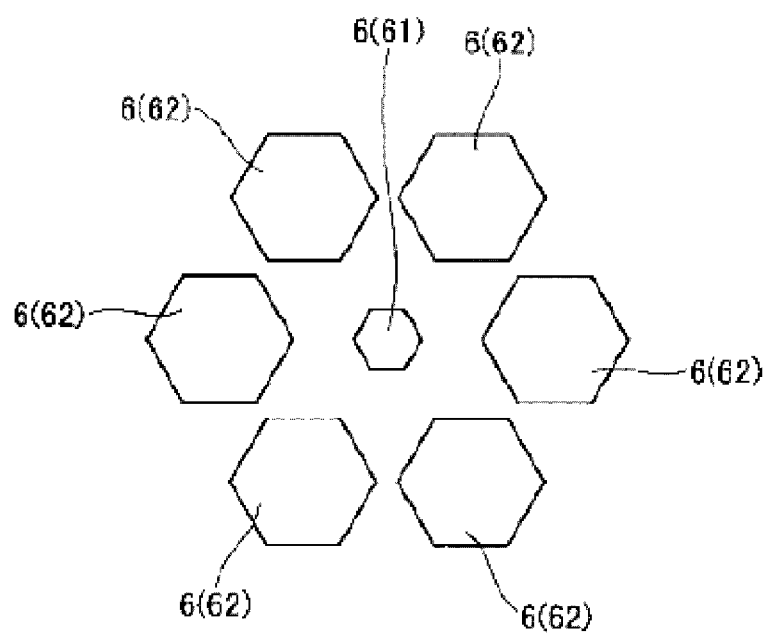
FIG. 6 is a plan view of another example of the protrusion of the pneumatic tire according to the embodiment of the present technology.

Note that the shape, when viewed planarly, of the protrusions 6 of the pneumatic tire of this embodiment may be, in addition to circular, elliptical or polygonal as illustrated in FIG. 6 (triangular, quadrangular, pentagonal, and the like). Additionally, in addition to having the same shape when viewed planarly, as illustrated in FIG. 6, the small protrusions 61 and the large protrusions 62 may have a different shape when viewed planarly.

Thus, the pneumatic tire of this embodiment includes rib-like land portions 3 partitioned by the plurality of main grooves 2 extending in the tire circumferential direction and/or block-like land portions 3 partitioned by the plurality of main grooves 2 and the plurality of lug grooves 4 intersecting the main grooves 2 in a tread surface 11. In such a pneumatic tire, the plurality of protrusions 6 is formed in the surface (tread surface 11) of the land portions 3. Furthermore, at least two types of the protrusions 6, having different surface areas, are provided. At least a majority of the protrusions 6 adjacent to a small protrusion 61 having a relatively small surface area are the large protrusions 62 having a relatively large surface area.

With this pneumatic tire, as a result of the plurality of protrusions 6 being disposed in the tread surface 11, a substantial contact patch can be ensured due to water of a water film interposed between an icy road surface and the tread surface 11 being discharged via a water path formed between the protrusions 6. Thus, it is possible to enhance performance on ice. Moreover, at least two types of the protrusions having different surface areas, small protrusions 61 and large protrusions 62, are provided and at least a majority of the protrusions 6 adjacent to a small protrusion 61 are the large protrusions 62. Therefore, a recess is formed in which the large protrusions 62 that experience relatively little contraction at ground contact surround a small protrusion 61 and the water of the water film in this recess and/or snow adhered to the tread surface 11 is collected, as shown by the arrow in FIGS. 2 through 4. As a result, discharge of the water and of the snow is facilitated and, thus, it is possible to enhance performance on snow and ice. Therefore, it is possible to discharge snow and water sufficiently, even at initial use, and enhance performance on snow and ice.

Note that it is preferable that the protrusions 6 be configured as a group consisting of a small protrusion 61 and the protrusions 6 adjacent to the small protrusion 61 and that this group is regularly disposed. In this embodiment, the protrusions 6 are configured as a group consisting of a small protrusion 61 and the six protrusions 6 adjacent to the small protrusion 61 and this group is regularly disposed. Through such a configuration, water discharge and snow discharge can be performed at all locations on the tread surface 11. Therefore, it is possible to enhance performance on snow and ice.

Note that with the protrusions 6, a number of the small protrusions 61 per land portion 3 unit or on the tread surface 11 throughout the entire tire is preferably not less than ⅛ and not more than ⅓ of a number of the large protrusions 62. Through such a configuration, water discharge and snow discharge can be performed throughout an entirety of the tread surface 11. Therefore, it is possible to enhance performance on snow and ice.

Additionally, with the pneumatic tire of this embodiment, the sipes 5 or small holes are formed in the surface (tread surface 11) of the land portions 3, and the plurality of protrusions 6 has a step (height) that is less than the depth of the sipes 5 or the small holes.

With this pneumatic tire, the sipes 5 or small holes are formed in the tread surface 11. This leads to the obtaining of edge effects and water discharging effects and, together with the protrusions, makes possible a prominent enhancement of performance on snow and ice.

Additionally, with the pneumatic tire of this embodiment, a surface area S1 of one of the small protrusions 61 having the relatively small surface area is preferably such that 0.05 $mm^2 \leq S1 \leq 20$ $mm^2$, and is preferably configured so as to be $20\% \leq S1/S2 \leq 75\%$ with respect to a surface area S2 of one of the large protrusions 62 having the relatively large surface area.

The surface area S1 of one of the small protrusions 61 is such that 0.05 $mm^2 \leq S1 \leq 20$ $mm^2$ and is configured so as to be not less than 20% with respect to the surface area S2 of one of the large protrusions 62. Therefore, it is possible to ensure the rigidity of the actual contact patch. Additionally, the surface area S1 of one of the small protrusions 61 is such that 0.05 $mm^2 \leq S1 \leq 20$ $mm^2$ and is configured so as to be not more than 75% with respect to the surface area S2 of one of the large protrusions 62. Therefore, a path for water discharging and a recess for snow discharging are obtained and it is possible to enhance water discharge performance and snow discharge performance. Therefore, with this pneumatic tire, water discharge performance and snow discharge performance are enhanced while the rigidity of the actual contact patch is ensured, and performance on snow and ice can be further enhanced.

Additionally, with the pneumatic tire of this embodiment, the height H of the protrusions 6 (see FIGS. 5-1 to 5-3) is preferably configured such that 0.1 $mm \leq H \leq 1.0$ mm.

It is possible to obtain a path and recess sufficient for discharging water and snow due to the height H of the protrusions 6 being configured so as to be not less than 0.1 mm. Additionally, it is possible to suppress uneven wear (heel & toe wear) caused by deformation when the protrusions 6 come in contact with the ground due to the height H of the protrusions 6 being configured so as to be not more than 1.0 mm. Therefore, with this pneumatic tire, water discharge performance and snow discharge performance are enhanced while the suppression of uneven wear at ground contact is ensured, and performance on snow and ice can be further enhanced. Note that configuring the height H of the protrusions 6 such that 0.2 $mm \leq H \leq 0.6$ mm is more preferable because prominent water and snow discharge effects and prominent uneven wear (heel & toe wear) suppression effects can be obtained.

Additionally, with the pneumatic tire of this embodiment, the minimum distance D between adjacent large protrusions 62 having the relatively large surface area is preferably configured such that 0.3 $mm \leq D \leq 1.0$ mm (see FIG. 2).

It is possible to ensure a path sufficient for discharging water due to the minimum distance D between adjacent large protrusions 62 being configured so as to be not less than 0.3 mm. Additionally, it is possible to suppress a decline in the rigidity of the land portions 3 and maintain traveling performance due to the minimum distance D between adjacent large protrusions 62 being configured so as to be not more than 1.0 mm Therefore, with this pneumatic tire, traveling performance is maintained while the water discharging effect is obtained, and performance on snow and ice can be further enhanced.

Additionally, with the pneumatic tire of this embodiment, the total ground contact area SP of the protrusions 6 in a given land portion 3 with respect to the surface area SL of the surface (tread surface 11) of the land portion 3 is preferably configured such that $50\% \leq SP/SL \leq 90\%$.

The ground contact area of the protrusions 6 indicates the surface area described above. Moreover, the total ground contact area SP of the protrusions 6 in a given land portion 3 with respect to the surface area SL of the surface (tread surface 11) of the land portion 3 is configured to be not less than 50%. Therefore, it is possible to ensure the rigidity of the actual contact patch. Additionally, the total ground contact area SP of the protrusions 6 with respect to the surface area SL of the surface (tread surface 11) of the land portion 3 is configured to be not more than 90%. Therefore, a path for water discharging and a recess for snow discharging are obtained and it is possible to enhance water discharge performance and snow discharge performance. Therefore, with this pneumatic tire, water discharge performance and snow discharge performance are enhanced while the rigidity of the actual contact patch is ensured, and performance on snow and ice can be further enhanced.

Additionally, with the pneumatic tire of this embodiment, the ground contact shape of the protrusions 6 is preferably circular.

With this pneumatic tire, due to the ground contact shape of the protrusions 6 being circular, ensuring a path width at forks and intersections in the path for discharging water is facilitated, and a difference in rigidity with respect to an angle of external forces on the protrusions 6 can be mitigated. Therefore, variations in traveling performance can be suppressed.

EXAMPLES

In the examples, performance tests for braking ability on ice and steering stability on snow were performed on a plurality of types of pneumatic tires under different conditions (see FIG. 7).

In these performance tests, a pneumatic tire having a tire size of 215/60R16 was assembled on a 16×7J rim, inflated to an air pressure of 220 kPa, and mounted on a test vehicle (2 L sedan, front-engine, rear-wheel (FR) vehicle, manufactured in Japan).

The method for evaluating braking ability on ice included driving the test vehicle described above on an icy test course at an initial speed of 80 km/h and then suddenly braking. The distance required for the test vehicle to come to a complete stop (braking distance) was measured. Evaluations were performed by indexing the measurement results with the conventional example as the standard score (100). In these indexed evaluations, higher scores were preferable.

The method for evaluating steering stability on snow included measuring the amount of time required for the test vehicle described above to corner around a circle having a radius of 30 m on a snowy road surface. Evaluations were performed by indexing the measurement results with the conventional example as the standard score (100). In these evaluations, higher scores were preferable.

A pneumatic tire of the Conventional Example was a studless tire having sipes provided in a surface of block-like land portions.

In contrast, the pneumatic tires of Working Examples 1 to 10 were provided with a plurality of protrusions having a step smaller than a depth of a sipe in a surface of block-like land portions. These protrusions consisted of small protrusions and large protrusions, and all the protrusions adjacent to the small protrusions were large protrusions. Additionally, the protrusions of the pneumatic tire of Working Example 1 were arranged as illustrated in FIG. 6. Furthermore, with the pneumatic tires of Working Examples 2 and 3, a surface area S1 of one of the small protrusions is stipulated, and a relationship S1/S2 between the surface area S1 of one of the small protrusions and the surface area S2 of one of the large protrusions was stipulated. Furthermore, with the pneumatic tires of Working Examples 4 and 5, a height H of the protrusions was stipulated. Furthermore, with the pneumatic tires of Working Examples 6 and 7, a minimum distance D between adjacent large protrusions was stipulated. Furthermore, with the pneumatic tires of Working Examples 8 and 9, a relationship SP/SL of a total ground contact area SP of the protrusions in one of the land portions to a surface area SL of the land portion is stipulated. Furthermore, with the pneumatic tire of Working Example 10, a ground contact shape of the protrusions is circular, as illustrated in FIG. 2.

As is clear from the test results shown in FIG. 7, the pneumatic tires of Working Examples 1 to 10 each displayed enhanced braking ability on ice and steering stability on snow.

As described above, the pneumatic tire according to the present technology is suitable as a pneumatic tire that discharges snow and water sufficiently, even at initial use, and whereby performance on snow and ice are enhanced.

What is claimed is;:

1. A pneumatic tire comprising: rib-like land portions partitioned by a plurality of main grooves extending in a tire circumferential direction and/or block-like land portions partitioned by the plurality of main grooves and a plurality of lug grooves intersecting the main grooves in a tread surface, wherein:
a plurality of protrusions are provided on a surface of the land portions, and
at least two types of the protrusions, having different surface areas, are provided on each of the land portions, wherein at least a majority of the protrusions adjacent to a protrusion having a relatively small surface area are protrusions having a relatively large surface area, and wherein the protrusion having the relatively small surface area and the protrusion having the relatively large surface area are disposed alternately in both the tire width direction and the tire circumferential direction.

2. The pneumatic tire according to claim 1, wherein sipes or small holes are formed in the surface of the land portion, and the protrusions have a step that is smaller than a depth of the sipes or the small holes.

3. The pneumatic tire according to claim 1, wherein a surface area S1 one of the protrusions having the relatively small surface area is such that $0.05 \text{ mm}^2 \leq S1 \leq 20 \text{ mm}^2$, and is configured so as to be $20\% \leq S1/S2 \leq 75\%$ with respect to a surface area S2 of one of the protrusions having the relatively large surface area.

4. The pneumatic tire according to claim 1, wherein a height H of the protrusions is configured such that $0.1 \text{ mm} \leq H \leq 1.0 \text{ mm}$.

5. The pneumatic tire according to claim 1, wherein a minimum distance D between adjacent protrusions having the relatively large surface area is configured such that $0.3 \text{ mm} \leq D \leq 1.0 \text{ mm}$.

6. The pneumatic tire according to claim 1, wherein a total ground contact area SP of the protrusions in a given land portion with respect to a surface area SL of the land portion is configured such that $50\% \leq SP/SL \leq 90\%$.

7. The pneumatic tire according to claim 1, wherein a ground contact shape of the protrusions is circular.

8. The pneumatic tire according to claim 1, wherein a height H of the protrusions is configured such that $0.2 \text{ mm} \leq H \leq 0.6 \text{ mm}$.

9. The pneumatic tire according to claim 1, wherein a number of the protrusions having the relatively small surface area per land portion is not less than ⅛ and not more than ⅓ of a number of the protrusions having the relatively large surface area.

10. The pneumatic tire according to claim 1, wherein the protrusions having the relatively small surface area are disposed in rows alternating in the tire circumferential direction with rows of the protrusions having the relatively large surface area, the protrusions having the relatively small surface area being offset in the tire width direction from the protrusions having the relatively large surface area.

11. The pneumatic tire according to claim 1, wherein:
a surface area S1 of one of the protrusions having the relatively small surface area is such that 0.05 mm² ≤ S1 ≤ 20 mm², and is configured so as to be 20% ≤ S1/S2 ≤ 75% with respect to a surface area S2 of one of the protrusions having the relatively large surface area;
a height H of the protrusions is configured such that 0.1 mm ≤ H ≤ 1.0 mm;
a minimum distance D between adjacent protrusions having the relatively large surface area is configured such that 0.3 mm ≤ D ≤ 1.0 mm; and
a total ground contact area SP of the protrusions in a given land portion with respect to a surface area SL of the land portion is configured such that 50% ≤ SP/SL ≤ 90%.

12. The pneumatic tire according to claim 1, wherein a surface area Si of the protrusion having the relatively small surface area is 0.05 mm² ≤ S1 ≤ 20 mm².

* * * * *